Jan. 30, 1951     K. W. JOHNSON     2,539,431
VIBRATION ISOLATOR
Filed Jan. 2, 1947
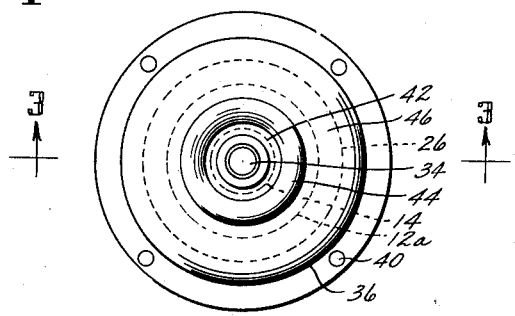
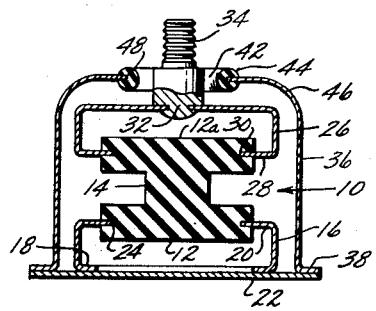
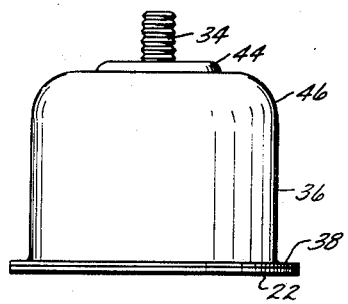
INVENTOR.
KENNETH W. JOHNSON
BY Wade Koontz
Frederick W. Cotterman
HIS ATTORNEYS Patented Jan. 30, 1951

2,539,431

UNITED STATES PATENT OFFICE 2,539,431

VIBRATION ISOLATOR

Kenneth W. Johnson, Dayton, Ohio

Application January 2, 1947, Serial No. 719,644

1 Claim. (Cl. 248—358)

(Granted under the act of March 3, 1883, as amended April 30, 1928; 370 O. G. 757)

The invention described herein may be manufactured and used by or for the Government for governmental purposes without payment to me of any royalty thereon.

This invention relates to vibration isolators and more particularly to a vibration unit which may be employed singly or in multiple.

An object of the invention is to provide a unit of this character which is self-contained.

Another object is to provide a vibration unit which has lower resonance than heretofore attained in a device of this kind.

Another object is to provide a vibration isolator which is more adaptable for light loads than similar devices presently being marketed.

Another object is to provide a vibration isolator which is adapted to both vertical and horizontal mounting.

Other objects and advantages will appear as the invention is more fully described with reference to the drawings, wherein:

Fig. 1 is a top plan view of my improved vibration isolator.

Fig. 2 is an elevation of the device.

Fig. 3 is an axial section taken at 3—3 of Fig. 1.

Like reference characters refer to like parts throughout the several views.

The vibration absorbing element 10 of my device consists of a pair of relatively thick diaphragms 12 and 12a of rubber or the like connected by a neck 14 of the same material preferably molded in a single piece.

A vibration element supporting member 16 is flanged inward both at the bottom and at the top as at 18 and 20 respectively. The lower flange 18 rests on a base plate 22 to which it may be welded or similarly secured. The upper flange 20 extends into an annular groove 24 formed around the perimeter of the lower diaphragm 12 preferably about midway of its thickness.

A load carrying member 26 is flanged inwardly at the lower end as at 28, the flange 28 extending into an annular groove 30 formed in the perimeter of the upper diaphragm 12a preferably about midway of its thickness.

The upper side of the load carrying member 26 is substantially closed except for a small opening 32 in the center in which a load supporting stud 34 is fastened. The load which is to be supported is carried by the stud 34.

Surrounding and enclosing the vibration absorbing element 10 and its associated parts 16, 26 and 34, is a housing 36 which may be flanged outwardly as at 38 and welded or similarly secured to the base plate 22. Mounting holes 40 may be provided in the flange 38.

The top of the housing 36 is open at 42 and a grommet 44 of rubber or like material provides a lining for the opening, the inturned edge 46 of the housing 36 extending into a groove 48 in the perimeter of the grommet. The opening in the grommet is enough larger than the load supporting stud to allow limited sway of the internal assembly and also provides a cushion stop for excessive shocks.

The device disclosed has additional advantages. In the employment of the double diaphragm, double deflection is provided, thereby giving better vibration characteristics including lower resonance and greater adaptability to light loading. In addition the unit is self-contained and may be used to advantage either singly or in multiple.

Having described an embodiment of my invention, I claim:

The combination, in a vibration isolator, of a housing in the form of a hollow cylinder flanged inwardly at the top to provide a constricted opening, a grommet of rubber or the like lining said constricted opening, a flexible member of rubber or the like normally concentrically positioned within said housing, said flexible member comprising a cylinder having a deep annular groove intermediate its ends dividing the cylinder into two discs of approximately the thickness of the deep annular groove, joined by a neck of smaller diameter, each disc being provided with a peripheral groove of less width and depth than said deep annular groove, an annular support for said flexible cylinder, said annular flexible cylinder support having its inner periphery snugly fitted into one of said peripheral grooves and the outer periphery fixed in said housing, an annular load support carried by said flexible cylinder, said annular load support having an inner periphery snugly fitted in the other of said peripheral grooves and a load carrying portion extending upwardly through and beyond said grommet, the opening in said grommet being enough larger than said upwardly extending portion to permit both vertical movement and sway of said upwardly extending portion from its normally concentric position in said grommet.

KENNETH W. JOHNSON.

REFERENCES CITED

The following references are of record in the file of this patent:

UNITED STATES PATENTS

| Number | Name | Date |
|---|---|---|
| 1,929,201 | Frohlich et al. | Oct. 3, 1933 |
| 2,351,725 | Wack | June 20, 1944 |
| 2,425,567 | Robinson | Aug. 12, 1947 |
| 2,447,712 | Nathan | Aug. 24, 1948 |